United States Patent [19]
Vassiliades et al.

[11] 3,875,074
[45] Apr. 1, 1975

[54] FORMATION OF MICROCAPSULES BY INTERFACIAL CROSS-LINKING OF EMULSIFIER, AND MICROCAPSULES PRODUCED THEREBY

[75] Inventors: Anthony E. Vassiliades, Deerfield; David N. Vincent, Glenview; Mabrin P. Powell, Chicago, all of Ill.

[73] Assignee: Champion International Corporation, New York, N.Y.

[22] Filed: Mar. 6, 1972

[21] Appl. No.: 232,183

[52] U.S. Cl. ............ 252/316, 8/79, 71/64 F, 117/36.2, 117/62.2, 117/100 A, 264/4, 424/33, 424/35
[51] Int. Cl. ........ B01j 13/02, B44d 1/02, B44d 1/44
[58] Field of Search .. 252/316; 117/100 A, 161 KP; 264/4; 260/77.5 AT; 424/33

[56] References Cited
UNITED STATES PATENTS

| 2,886,445 | 5/1959 | Rosenthal et al. | 99/135 |
| 3,242,051 | 3/1966 | Hiestand et al. | 252/316 X |
| 3,432,327 | 3/1969 | Kan et al. | 252/316 X |
| 3,723,372 | 3/1973 | Wakimoto et al. | 117/161 KP X |
| R24,899 | 11/1960 | Green | 252/363.5 X |

FOREIGN PATENTS OR APPLICATIONS

| 1,163,023 | 9/1969 | United Kingdom | 252/316 |

*Primary Examiner*—Richard D. Lovering
*Attorney, Agent, or Firm*—Roylance, Abrams, Berdo & Kaul

[57] ABSTRACT

Pressure-rupturable, oil-containing microcapsules are produced by admixing a water-immiscible, oily material containing an oil-soluble, cross-linking agent, which is either a polyfunctional isocyanate or an orthoester of a group IV element with an aqueous solution of an hydroxyl group-containing, polymeric emulsifying agent selected from the group consisting of polyvinyl alcohol, methyl cellulose, starch and benzyl-substituted starch to cross-link the emulsifier and form a capsule wall at the oil/water interface of the resulting oil-in-water emulsion around the oil droplets. The emulsifying agent is the sole co-reactant for the oil-soluble cross-linking agent.

23 Claims, No Drawings

FORMATION OF MICROCAPSULES BY INTERFACIAL CROSS-LINKING OF EMULSIFIER, AND MICROCAPSULES PRODUCED THEREBY

This invention relates to a microencapsulation system. More particularly, this invention relates to a process for the encapsulation of minute oil droplets, to microcapsules produced thereby, and to pressure-responsive, transfer-copy systems employing such microcapsules.

Microcapsules containing both liquid and solid nucleus materials have found widespread acceptance in a variety of commercial applications. For example, one of the most widespread uses has been in the art of transfer-copy systems wherein minute droplets of a colorless dye intermediate dispersed or dissolved in an oil are encapsulated and coated onto a transfer sheet. The dye intermediate is thereafter transferred to a copy sheet by rupturing said capsules. The underlying copy sheet has an adsorbent coating thereon containing a material which will react with the dye intermediate causing a visible colored mark at points where the microcapsules have been ruptured and the dye transferred. Other recent applications in which microcapsules have been used extensively are in adhesives and adhesive tapes, fertilizers, pharmaceuticals, foods and cosmetics.

A microencapsulation system has been described in copending U.S. patent application Ser. No. 174,045 entitled "Microencapsulation System" that was filed on Aug. 23, 1971 in the name of A. E. Vassiliades, wherein microcapsules are formed by providing a cross-linking or complexing agent to an emulsion containing an emulsifying agent which is a preformed polymer which possesses cross-linkable groups or complexing sites. This system avoided the need for any extraneous hardening agents in order to provide capsules having a high degree of structural integrity.

Another microencapsulation system has been described in copending U.S. patent application Ser. No. 55,925 entitled "Water-Resistant Microcapsular Opacifier System and Products" that was filed on July 17, 1970 in the name of M. P. Powell, now U.S. Pat. No. 3,779,941, issued on Dec. 18, 1973 wherein oil-containing microcapsules are produced by the reaction of a polymeric, oil-soluble cross-linking agent with a polymeric emulsifying agent. Thus, a thermosetting condensation polymer-containing oily solution and a thermoplastic polymer-containing aqueous solution are admixed, and a chemical reaction occurs at the oil/water interface to provide a solid, cross-linked, resinous capsule wall having excellent resistance to water.

It has now been found that pressure-rupturable, oil-containing microcapsules having good structural integrity may be produced by a process which comprises providing an aqueous solution of a water-soluble, polymeric, film-forming, emulsifying agent, which emulsifier possesses hydroxyl groups, and thereafter forming an emulsion by admixing a water-immiscible, oily material containing an oil-soluble, non-polymeric cross-linking agent for said emulsifying agent selected from the group consisting of polyfunctional isocyanates and orthoesters of Group IV elements. The cross-linking agent interacts with the hydroxyl groups of the polymeric emulsifying agent to form a solid, cross-linked, resinous, capsule wall.

Thus, a process for the formation of pressure-rupturable oil-containing microcapsules is provided which comprises admixing:

A. a water-immiscible, oily material containing an oil-soluble, non-polymeric cross-linking agent selected from the group consisting of a polyfunctional isocyanate and an orthoester of a Group IV element; and
B. an aqueous solution of an hydroxyl groupcontaining, polymeric, emulsifying agent;

said admixing being conducted under conditions to form an oil-in-water emulsion wherein said oily material is dispersed in the form of microscopic emulsion droplets in an aqueous, continuous phase, reacting said cross-linking agent with said polymeric emulsifying agent and thereby surrounding each of said droplets with a solid, cross-linked capsule wall, said polymeric emulsifying agent being the sole reactant for said cross-linking agent.

The reaction of the cross-linking agent with the polymeric emulsifying agent, i.e., the curing step, may be conducted at any suitable temperature, for example, between about ambient temperature and about 100°C. for periods of time between about 1 and about 24 hours. The upper temperature at which the curing step may be conducted is only limited by the temperature at which the emulsion will break, i.e. the stability limit of the emulsion. Preferably, the cross-linking reaction is conducted at a temperature in the range of between about 40° and about 80°C., for a period of about 1-3 hours.

The ratio of polymeric emulsifying agent to cross-linking agent that is provided in the emulsion is at least 1 part by weight of emulsifying agent per part of cross-linking agent. Thus, suitable ratios of emulsifier to cross-linking agent include between 1 and about 100 parts by weight of emulsifying agent per part of cross-linking agent, preferably between about 4 and about 20 parts by weight of emulsifying agent per part of cross-linking agent.

The encapsulation system of the present invention offers many distinct advantages. For example, the present system eliminates the need for a separate emulsifying agent and a separate co-reactant for the cross-linking agent. Thus, prior systems, such as those involving interfacial polycondensation, have required that separate, monomeric, co-reactants be provided in the discontinuous oil phase and in the continuous water phase, respectively, of the emulsion system in addition to an emulsifying agent. On the other hand, the present system employs a dual-functional, polymeric emulsifying agent which not only aids in the formation of the emulsion, but is cross-linked at the oil/water interface from within the oil droplet by a non-polymeric cross-linking agent to form the solid, capsule wall. Thus, the addition of a separate, monomeric co-reactant in the continuous phase, such as in prior interfacial polycondensation processes, is obviated. Other encapsulation systems have been proposed whereby a cross-linking agent precursor is initially provided in the water-insoluble internal phase. However, the precursor material must be then converted into a water-soluble cross-linking agent in order to react with the polymeric wall-forming material. In contradistinction thereto, the cross-linking agent of the present invention is oil-soluble and need not be converted to a water-soluble form in order to undergo a cross-linking reaction with the polymeric emulsifying agent of the present invention. Although it is not intended to limit this invention by any particular theory or mechanism, it is believed that the polymeric emulsifying agent is adsorbed on the surface of the oil droplet, and the oleophilic portions of this molecule dip into and penetrate the oil phase, thus carrying with it a number of adjacent hydroxyl groups. The oil-soluble cross-linking agent reacts with these groups in the oil phase forming cross-links between polymer chains and thereby insolubilize the adsorbed polymeric layer at the oil droplet/water interface.

This cross-linked polymeric shell, now being insoluble in both the water and oil phases is immobilized at this interface and no longer can participate in adsorption-desorption equilibria. In this way a shell is built around the oil droplet forming the desired microcapsules by a reaction taking place on the oil side of the oil/water interface. The present cross-linking agents are highly water sensitive and are very rapidly rendered inactive if they come into contact with the water phase.

The polymeric, emulsifier of the present invention is employed as the major wall former, and is therefore provided to the system in amounts exceeding the usual "emulsifying amount" of such material. As will be hereinafter discussed, the ratio of wall-forming emulsifier to cross-linking agent is at least one part of emulsifier per part of cross-linking agent.

Another advantage of the present invention resides in the fact that the cross-linking agent is provided to the emulsion in the oil phase, which later forms the core of the microcapsule. Thus, the cross-linking agent is efficiently used and effectively positioned to contribute to the formation of the capsule wall from the inside of the wall. In many prior systems a co-reactant is provided to the emulsion by means of the continuous phase and becomes dispersed throughout such phase. Therefore, such co-reactant does not fully contribute to the formation of the capsule wall, since it is at least partially unavailable at the oil/water interface for reaction.

The microcapsules of the present invention are capable of being employed in carbonless copy systems and provide excellent properties thereto. For example, the capsules of the present invention are able to retain highly volatile oils during exposure of the coated copy paper to severe conditions of temperature, humidity, and the like.

The solid coating or wall of the microcapsules of the present invention are initially formed around the dispersed oil droplets solely by providing the oil-soluble cross-linking agent to the emulsion, which cross-linking agent is dissolved in the oily material that is admixed with the aqueous continuous phase containing the polymeric emulsifying agent. The term "solely" or "sole co-reactant" as used herein is intended to exclude the formation of the solid capsule wall by providing in the continuous phase a monomeric co-reactant for the oil-soluble cross-linking agent. However, the term "solely" as used herein is not intended to exclude, for example, the addition of a second cross-linking agent for the emulsifying agent.

Also, the use of any material for inducing phase separation is excluded, such as has been the case in prior systems involving "coacervation". Thus, the present system is conducted in the absence of coacervation thereby obviating the need for coacervating agents, such as sodium sulfate or the like to cause a liquid-liquid phase separation.

Thus, according to another aspect of the invention, a second cross-linking agent may be added to the already-formed microcapsular dispersion in order to insure complete insolubilization of the wall-forming emulsifying agent. This permits the utilization of water-sensitive emulsifying agents, while obviating moisture sensitivity in the final coated paper product. The capsules of the present invention provide excellent carbonless copy paper having good dimensional stability, which paper will not have undersirable curl problems and the like due to moisture.

Suitable oil-soluble polyfunctional isocyanates that may be employed in the present invention include, for example, 4,4'-diphenylmethane diisocyanate, toluene diisocyanate, hexamethylene diisocyanate, triphenylmethane triisocyanate, mixtures of such isocyanates, and adducts of such isocyanates with polyhydric alcohols, such as trimethylolpropane.

The orthoesters of Group IV elements which may be employed as cross-linking agents include the aliphatic and aromatic orthoesters of Group IVa and IVb elements, preferably the lower alkyl and aryl orthoesters of Group IV elements, such as tetraethyl orthosilicate, tetrapropyl orthosilicate, tetraphenyl orthosilicate, tetraethyl titanate, tetrapropyl titanate, tetrabutyl titanate, tetraphenyl titanate, tetraethyl germanate, tetrapropyl orthocarbonate, and the like.

As previously mentioned, the film-forming polymeric emulsifying agent of the present invention is an hydroxyl group-containing polymer. Suitable hydroxyl group-containing polymers include polyvinyl alcohol, methyl cellulose, starch, and the like.

The polyvinyl alcohol especially preferred in this process are those grades known as 88 percent (nominal) hydrolyzed, high molecular weight products (e.g., commerically available as Covol 97-40 from CPI or Elvanol 50-42 from DuPont). However, any of the available water-soluble grades, either fully or partially hydrolyzed, high or low molecular weight, can be utilized.

Substituted starches are the preferred form of starch for use in the present invention and may be provided by any suitable process. For example, they may be provided by an etherification of the starch in granule form under non-gelatinizing conditions with a monofunctional etherifying agent which provides the starch with ether-linked hydrophobic groups. Thus, the starch granule will become more oleophilic due to the presence of a high percentage of hydrophobic groups. The hydrophobic groups may be, for example, alkyl groups having at least three carbon atoms, aralkyl groups containing at least seven carbon atoms, and the like. Thus, the term "substituted starch" as employed herein refers to a starch that has been rendered more oleophilic due to an increase in hydrophobic groups.

Suitable etherifying agents, which react with ungelatinized granule starch in alkaline media to produce substituted starch, include alkyl halides containing at least three carbon atoms, for example, alkyl chloride or bromide, and three substituted alkyl halides such as methallyl chloride; aralkyl halides, for example, benzyl chloride or bromide, p-halo benzyl chloride or bromide, or 3-choro propenyl benzene; epoxy reagents, for example, phenyl glycidyl ether and allyl glycidyl ether.

The etherification reaction is conducted until the starch becomes more hydrophobic and essentially non-gelatinizable. Finally, the starch is fragmented and reduced to submicronsized particles by treatment with steam under pressure. The starch is not swollen or cooked but is reduced to very fine particles which are mainly in the microscopic or colloidal size range. Such starches are described, for example, in U.S. Pat. No. 3,462,283 to Hjermstad et al. the disclosure of which is hereby incorporated by reference.

The polyfunctional isocyanate or orthoester cross-linking agent is utilized in amounts sufficient to result in the formation of microcapsules. The relative amounts vary with the particular system, and may be easily determined in each case. However, in contradistinction to prior encapsulation systems, the hydroxyl group-containing polymeric emulsifying agent of the present invention is dual functional, and serves not only as emulsifying agent, but preferably provides the major portion of the capsule shell.

Thus, the polymeric emulsifying agent is provided in relatively substantial amounts of, for example, at least 1 part by weight of emulsifier per part of cross-linking agent, with between about 4 and about 20 parts emulsifier per part by weight of the oil-soluble cross-linking agent being preferred as previously indicated. An especially preferred range of cross-linking agent based upon the oil is between about 1 and about 40 weight percent of cross-linking agent, preferably between about 2 and about 10 weight percent.

Emulsification may be conducted at any suitable temperature. For example, temperatures in the range of between about 20° and about 100°C., although temperatures outside of this range may also be utilized. Subsequent to emulsification, the microcapsular dispersion may be heated to a temperature, for example, in the range of between about 40° and about 80°C. for a period of between about 1 and about 4 hours under conditions of mild agitation in order to accelerate the cross-linking reaction. The cross-linking reaction may be likewise conducted at ambient temperatures for longer periods of time, e.g. 24, while obtaining similar results.

According to another aspect of the invention, a second cross-linking agent for the polymeric emulsifying agent may be added to the microcapsular dispersion after formation of the solid, cross-linked walls by the reaction between the oil-soluble cross-linking agent within the oil droplets and the emulsifying agent. Thus, a second cross-linking agent, which may be a nonmetallic material, such as a formaldehyde condensation product, e.g., urea-formaldehyde, melamineformaldehyde, or an aldehyde, such as glyoxal, etc., may be added via the aqueous, continuous phase of the dispersion. Suitable amounts of the second cross-linking agent include the same amounts that are utilized for the oil-soluble cross-linking agent. Exemplary amounts of the second cross-linking agent include, between about 1 and about 20 parts of emulsifier per part of the second cross-linking agent. Thus, the water sensitivity of an emulsifying agent, such as polyvinyl alcohol, may be substantially improved by the addition of an additional cross-linking agent to the external phase of the microcapsular dispersion at any time prior to coating the dispersion on paper.

By "water immiscible oily materials" is meant lipophilic materials which are preferably liquid, such as oils, which will not mix with water and which are inert with regard to components of the particular system. Low melting fats and waxes may also be used in this invention. However, oils are the preferred nucleus materials since they do not require temperature maintenance. In certain embodiments of this invention, the vapor pressure and viscosity of the oily material are to be considered. For example, in the art of making a transfer sheet record material, a low viscosity-low vapor pressure oil is preferred. The viscosity of the oily medium is a determining factor in the speed with which the markings can be transferred to the copy sheet since low viscosity oils will transfer more quickly than oils of higher viscosity. The vapor pressure should be sufficiently low to avoid substantial losses of the oil through evaporation during the encapsulation operation. Suitable oily materials which may be employed as the carrier for the cross-linking agent include the aliphatic and aromatic hydrocarbon oils, such as kerosene, mineral spirits, naphtha, xylene, toluene, and the like. Also, for example, terpenes, such as turpentine; esters, such as dimethyl phthalate, dioctyl phthalate, dimethyl azelate, methyl 2-ethylhexanoate, 2-ethylhexyl acetate, and the like may be employed.

The amount of emulsifying agent relative to the oily nucleus material employed will vary over a wide range depending upon the particular system under consideration. However, suitable amounts include between about 5 and about 100 parts of emulsifying agent per 100 parts by weight oil, preferably between about 10 and about 50 parts of emulsifying agent per 100 parts by weight oil.

Within the scope of the present invention, the herein-disclosed processes may be used to encapsulate an oil alone, or alternatively, the oil may serve merely as a vehicle for carrying another active ingredient or material. In this latter utility, the active material may be dissolved, dispersed or suspended in the oily material. The processes of this invention can, therefore, be used to encapsulate medicines, poisons, foods, cosmetics, adhesives or any other material which finds utility in microcapsular form.

In the preferred utility of this invention, viz., transfer sheet record material, the precess may be used to encapsulate an oily printing ink, such as may be used in smudge-proof typewriter ribbons or carbon papers. In such a use, it has been found expedient to encapsulate a colorless, water-insoluble dye intermediate dissolved in the oil. Colorless dye intermediates are wholly conventional in such utilities and are well known in the art. Exemplary of the colorless dye intermediates which have been contemplated for use in this invention are leuco dyes, such as, crystal violet lactone and derivatives of bis(p-dialkylaminoaryl) methane such as disclosed in U.S. Pat. Nos. 2,981,733 and 2,981,738. These dye intermediates are colorless in an alkaline or neutral medium and react to form a visible color in an acidic medium. Thus, when a capsule containing such a compound is ruptured and the compound is discharged onto an adsorbent, acidic electron-acceptor material, such as a paper web coated with an organic or an inorganic acid material, a visible color appears on the adsorbent material at the point of contact.

Inhibitors may optionally be dispersed in the oily material along with the dye intermediates. Such materials are helpful in preventing the light and heat degradation of the intermediates during the encapsulation procedure, especially when elevated temperatures are required, such as when a fat is encapsulated. Inhibitors are also considered to aid in the stabilization of the colored marking on the copy sheet against the effects of the atmosphere. A small amount (generally about 1 to 10 percent by weight of the dye) of an inhibitor, such as N-phenyl 2-naphthylamine, may be used in the practice of this invention.

The leuco dye intermediates which are mentioned above are, in general, oil soluble. Oils which are inert with respect to the dye and in which the dye has appreciable solubility, e.g. above 0.5 grams of dye per 100 grams of oil, are preferable.

Microcapsules having diameters ranging from 0.1 to several hundred microns can be produced by the process of this invention. However, capsules having diameters in the range of 3.0 to 5.0 microns are preferred for transfer copy systems.

The emulsion containing the microcapsules may be either coated directly onto a web material and dried or the microcapsules may be separated from the emulsion by some physical means such as filtration or centrifugation; washed, if desired; redispersed in a solution of a binder; coated onto a web material and dried. Suitable binders include methyl cellulose, starch, casein, polyvinyl alcohol, polyvinyl acetate latex, and styrene-butadiene latex. Alternatively, materials such as urea-formaldehyde or melamine-formaldehyde condensates may be employed.

The microencapsulated oils of this invention are suitable for use in the manufacture of transfer sheet record material. More specifically, capsules containing a leuco dye intermediate in the oil are to be coated onto one side of a web material and dried. The coating operation is performed by conventional means, such as by use of an air knife. The capsule coatings are dried at temperatures ranging from about 40° to 75°C. At these temperatures, no appreciable degradation of the capsules, and in particular, the leuco dye intermediate, takes place.

The web material commonly used in transfer sheet record material is paper and is, therefore, preferable in the practice of this invention. However, the microcapsules produced by the herein-disclosed processes are also capable of being coated onto other materials such as plastic and fabric or textile webs. When using a web material having a high degree of porosity, it is advisable to pre-coat the web with a material which will reduce seepage of the microcapsular coating through the web. Impregnating the web material with polyvinyl alcohol or a butadiene-styrene latex is the conventional practice for producing an essentially impervious substrate.

Transfer sheets made according to the various embodiments of this invention have a pleasant appearance and are almost completely smudge-proof when brought into face-to-face contact with a copy sheet containing a coating of an adsorbent electron-acceptor material. In addition, they show a marked improvement over the transfer sheets presently available in commerce. It has been found that coated paper comprising microcapsules which contain a leuco dye intermediate dissolved in the oil and which microcapsules are formed by the process of this invention are extremely stable.

The following examples illustrate the best modes contemplated for carrying out this invention. All percentages are by weight unless otherwise specified.

EXAMPLE 1

Six hundred sixty seven grams of a 6 percent by weight aqueous solution of polyvinyl alcohol (commercially available as Elvanol 50-42 from DuPont) are charged to a Waring blender. Meanwhile, an oil comprising a 50/50 mixture of partially hydrogenated terphenyl and coconut oil and containing 2.1 percent crystal violet lactone and 1.8 percent benzoyl leucomethylene blue is provided with 2 percent by weight of the oil-soluble cross-linking agent, 4,4'-diphenylmethane diisocyanate, based upon the oil.

Approximately 93.5 parts by volume of the oil containing the dissolved diisocyanate are added to the aqueous polyvinyl alcohol solution under conditions of brisk agitation, e.g. employing a Waring blender. Emulsification is continued until a particle size of about 3 to 5 microns diameter is obtained.

The emulsion is then heated while under mild agitation at a temperature of 70°C. for between about 1 and about 4 hours to form microcapsules having solid, cross-linked, oil-impermeable capsule walls.

The resulting microcapsular suspension is cooled and a 5 percent aqueous solution of hydroxyethyl cellulose binder is added. The dispersion is then coated onto a paper web substrate and dried to provide a pressure-rupturable transfer sheet.

EXAMPLE 2

One hundred grams of the oily material monoisopropyl biphenyl, containing 2.1 grams of crystal violet lactone and 1.8 grams of benzoyl leucomethylene blue are provided with 3.0 grams of a 3 to 1 molar adduct of toluene diisocyanate and trimethylolpropane. The resulting oily solution is then slowly added to 267 grams of a 15 percent aqueous solution of polyvinyl alcohol (Elvanol 70-05) under conditions of brisk agitation in a Waring blender. Agitation is continued until the emulsion particles reach an average particle diameter of about 4 to 5 microns. The emulsion is then heated while under mild agitation at a temperature of 60°C. for 2 hours. Discrete microcapsules having a coherent wall structure are provided.

The resulting dispersion is coated onto a paper web to provide a transfer copy sheet. The paper web is dried at a temperature of about 50° to 60°C.

EXAMPLE 3

The procedure of Example 2 is repeated with the exception that prior to heating the emulsion under conditions of mild agitation, 2 grams of melamine-formaldehyde condensation product are added to the microcapsular dispersion in order to further insolubilize the capsule wall from the outside of the capsule.

The resulting microcapsular dispersion is coated onto a paper web and dried to provide a pressure-rupturable transfer sheet as before.

EXAMPLE 4

One hundred grams of a water-immiscible oily material, i.e. a partially hydrogenated terphenyl containing 2.1 grams of crystal violet lactone and 1.8 grams of benzoyl leucomethylene blue are provided with 10 grams of tetrabutyl-titanate.

The resulting solution is then slowly added to 500 grams of a 6 percent by weight aqueous methyl cellulose solution which is being briskly agitated in a Waring blender. Agitation is continued until discrete microcapsules having a particle size of 4 to 5 microns are obtained.

The resulting microcapsular dispersion is coated onto a paper substrate to provide a transfer copy sheet as before.

EXAMPLE 5

One hundred grams of an alkylated, partially hydrogenated naphthalene oil, containing 2.1 percent by weight crystal violet lactone, 1.8 percent by weight benzoyl leucomethylene blue, and from 1 to 10 percent of the 3 to 1 molar reaction product of toluene diisocyanate with trimethylolpropane, are emulsified in from 200 to 800 grams of a 5 percent aqueous solution of a high molecular weight, about 88 percent hydrolyzed, polyvinyl alcohol employing a Waring blender. Emulsification is continued until a particle size of about 3 to 5 microns in diameter is obtained.

The emulsion is then heated while under mild agitation at a temperature of about 60°C. fOr about 2 hours.

The resulting microcapsular suspension is cooled and from 1.4 grams to 5.7 grams of a 70 percent by weight aqueous solution of a melamine-formaldehyde condensation product, and from 10 grams to 40 grams of a 5 percent by weight aqueous solution of carboxymethyl cellulose are added. The dispersion is then coated onto a paper substrate to provide a pressure-rupturable transfer sheet.

Although the invention has been described in considerable detail with particular reference to certain preferred embodiments thereof, variations and modifications can be effected within the spirit and scope of the invention as described hereinbefore, and as defined in the appended claims.

We claim:

1. A process for the formation of pressure-rupturable, oil-containing microcapsules, which comprises admixing:
   A. a water-immiscible, oily material containing an oil-soluble, non-polymeric cross-linking agent selected from the group consisting of a polyfunctional isocyanate and an orthoester of a Group IV element; and
   B. an aqueous solution of an (hydroxy-group containing,) organic, polymeric, emulsifying agent, containing a plurality of hydroxyl groups, and selected from the group consisting of polyvinyl alcohol, methyl cellulose, starch and benzyl-substituted starch, said admixing being conducted under conditions to form an oil-in-water emulsion, wherein said oily material is dispersed in the form of microscopic emulsion droplets in an aqueous, continuous phase, said emulsifying agent aiding in the formation of said emulsion and possessing cross-linkable hydroxyl groups capable of reacting with said cross-linking agent to form a cross-linked capsule wall at the oil/water interface, reacting said cross-linking agent with said hydroxyl groups of said polymeric emulsifying agent and thereby surrounding each of said droplets with a solid, cross-linked capsule wall, said polymeric emulsifying agent being the sole co-reactant for said oil-soluble cross-linking agent.

2. The process of claim 1 wherein said emulsifying agent is employed in a ratio of at least 1 part of said polymeric emulsifying agent per part by weight of said cross-linking agent.

3. The process of claim 2 wherein a ratio of between about 4 and about 20 parts by weight of said polymeric emulsifying agent per part of cross-linking agent is employed.

4. The process of claim 1 wherein said cross-linking agent is a polyfunctional isocyanate.

5. The process of claim 4 wherein said polyfunctional isocyanate is a member selected from the group consisting of 4,4'-diphenylmethane diisocyanate, toluene diisocyanate, hexamethylene diisocyanate, triphenylmethane triisocyanate, and adducts thereof with polyhydric alcohols.

6. The process of claim 5 wherein said polyfunctional isocyanate is 4,4'-diphenylmethane diisocyanate.

7. The process of claim 5 wherein said polyfunctional isocyanate is toluene diisocyanate.

8. The process of claim 5 wherein said polyfunctional isocyanate is an adduct of toluene diisocyanate and trimethylolpropane.

9. The process of claim 1 wherein said cross-linking agent is an orthoester of a Group IV element.

10. The process of claim 9 wherein said cross-linking agent wherein said cross-linking agent is either tetraethyl orthosilicate, tetrabutyl titanate or tetrapropyl orthocarbonate.

11. The process of claim 10 wherein said cross-linking agent is tetrabutyl titanate.

12. The process of claim 1 wherein said emulsifying agent is a member selected from the group consisting of polyvinyl alcohol, methyl cellulose and starch.

13. The process of claim 8 wherein the emulsifying agent is polyvinyl alcohol.

14. The process of claim 1 wherein a second cross-linking agent is added to an aqueous dispersion of said solid-walled microcapsules.

15. The process of claim 14 wherein said second cross-linking agent is a formaldehyde condensation product.

16. The process of claim 15 wherein said second cross-linking agent is melamine-formaldehyde.

17. Pressure-rupturable microcapsules as made according to the process of claim 1.

18. A process for the formation of pressure-rupturable, oil-containing microcapsules which comprises admixing:
   A. A water-immiscible, oily material containing an oil-soluble, non-polymeric polyfunctional isocyanate cross-linking agent and a colorless, water-insoluble dye intermediate compound; and
   B. an aqueous solution of an organic, polyhydroxyl, polymeric, emulsifying agent selected from the group consisting of polyvinyl alcohol, methyl cellulose, starch and benzyl-substituted starch, said admixing being conducted under conditions to form an oil-in-water emulsion, wherein said oily material is dispersed in the form of microscopic emulsion droplets in an aqueous, continuous phase, said emulsifying agent aiding in the formation of said emulsion and possessing cross-linkable hydroxyl groups capable of reacting with said cross-linking agent to form a cross-linked capsule wall at the oil/water interface, reacting said cross-linking agent with said hydroxyl groups of said polymeric emulsifying agent and thereby surrounding each of said droplets with a solid, cross-linked capsule wall, said polymeric emulsifying agent being the sole co-reactant for said oil-soluble cross-linking agent.

19. The process of claim 18 wherein said dye intermediate compound is crystal violet lactone.

20. The process of claim 4 wherein said emulsifying agent is a member selected from the group consisting of polyvinyl alcohol, methyl cellulose and starch.

21. The process of claim 18 wherein the emulsifying agent is a benzyl-substituted starch.

22. The process of claim 20 wherein the emulsifying agent is polyvinyl alcohol.

23. The process of claim 20 wherein the emulsifying agent is methyl cellulose.

* * * * *